United States Patent [19]

Tsinberg

[11] Patent Number: 4,977,454
[45] Date of Patent: Dec. 11, 1990

[54] HDNTSC CHANNEL WITH FREQUENCY MULTIPLEXING

[75] Inventor: Mikhail Tsinberg, Riverdale, N.Y.

[73] Assignee: U.S. Philips Corporation, New York, N.Y.

[21] Appl. No.: 239,096

[22] Filed: Aug. 31, 1988

[51] Int. Cl.⁵ .............................................. H04N 7/04
[52] U.S. Cl. .................................... 358/141; 358/142
[58] Field of Search ................... 358/141, 142, 11, 12, 358/133

[56] References Cited

U.S. PATENT DOCUMENTS

| | | | |
|---|---|---|---|
| 4,581,640 | 4/1986 | Cole | 358/12 |
| 4,661,850 | 4/1987 | Strolle | 358/21 R |
| 4,670,783 | 6/1987 | Nadar | 358/141 |

FOREIGN PATENT DOCUMENTS 3341393  6/1985  Fed. Rep. of Germany .

OTHER PUBLICATIONS

Tsinberg, Mikhail, "ENTSC Two-Channel Compatible HDTV System", IEEE vol. CE-33 #3, 8/87.

Primary Examiner—Howard W. Britton
Assistant Examiner—David E. Harvey
Attorney, Agent, or Firm—Michael E. Marion

[57] ABSTRACT

A high definition television encoder which provides an efficient use of bandwidth, segments line differential signals into left panel, center segment, and right panel line differential signals, and time expands the left and right panel line differential, panel, and luminance signals. The time corresponding expanded left and right panel line differential signals are arranged in time coincidence and quadrature modulated, as are the corresponding segments of the panel signals. The quadrature modulations providing signals in contiguous frequency bands. Luminance signals are converted to a band abutting the contiguous frequency bands as are digital stereo audio signals. Center segment line differential signals are time expanded to be consistent with conventional television horizontal line times and quadrature modulated with the television image signals to occupy a frequency band contiguous with the abutting and contiguous frequency bands.

22 Claims, 4 Drawing Sheets

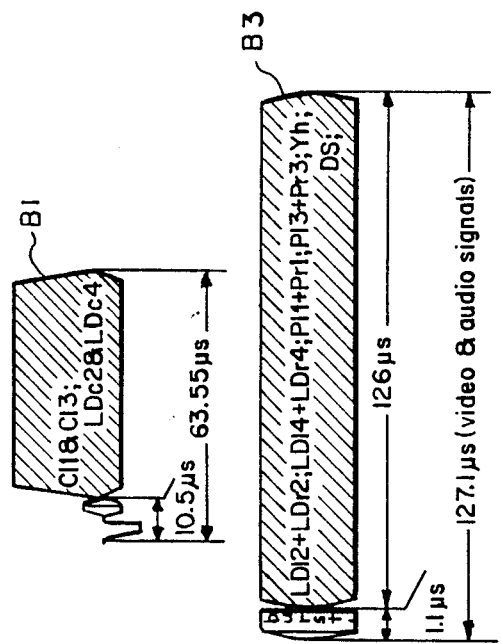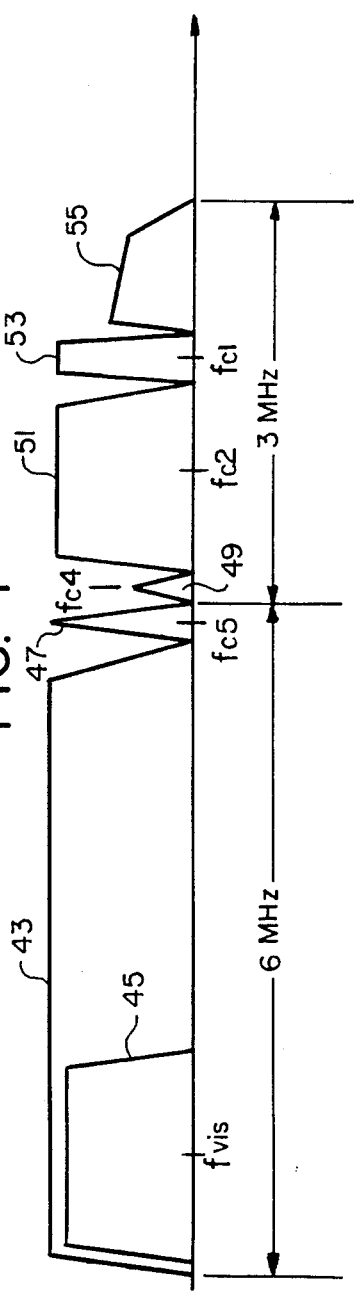

HDNTSC CHANNEL WITH FREQUENCY MULTIPLEXING

BACKGROUND OF THE INVENTION

1. Field of the Invention

The invention pertains to television information transmission and reception and more particularly to the transmission and reception of high definition television signals comprising augmentation panels to the left and right of a NTSC compatible center panel, high frequency luminance, and stereo high fidelity audio.

2. Description of the Prior Art

Conventional NTSC color television systems transmit picture information at a rate of 59.94 picture fields per second, two constituting a frame, each frame consisting of 525 horizontal scan lines. To reduce the transmission and reception bandwidths required to reproduce the transmitted picture, these horizontal scan lines are interlaced from field-to-field With a ratio of two-to-one, that is only every other scan line is transmitted in each field. Scan lines omitted in one field are transmitted in the next succeeding field, thus all the odd numbered fields contain one set of scan lines and the even numbered fields contain the set of scan lines which interlace with the scan lines in the odd numbered fields. This arrangement permits the transmission, reception, and picture reproduction at bandwidths reduced from that required for every scan line to be transmitted in each frame.

Television pictures reproduced in these conventional systems have aspect ratio of four to three, i.e. for every four units of horizontal width there are three units of vertical height. High definition television (HDTV) systems utilize TV screens with aspect ratios that are increased from the conventional 4:3 to aspect ratios of 16:9 transmit information for an entire image frame without field interlacing, thus providing improved picture resolution. To maintain compatibility with existing TV receivers the HDTV is divided into three panels, the center panel comprising the conventional TV picture, while and the augmentation for HDTV is contained in the panels on the left and right of this center panel. The augmentation signals for providing the left and right panels are transmitted separately from the conventional TV signals. These signals are combined in the HDTV receiver, while the augmentation signals are ignored by the conventional receivers. Additionally, sound quality is improved with the transmission of digital stereo audio of compact disc quality.

Techniques for providing HDTV-NTSC compatible television signals and augmentation signals are disclosed in U.S. patent applications Ser. Nos. 057,847; 057,849; 122,148; and 084,968 U.S. Pat. No. 4,873,567. All these applications are assigned to the assignee of the present invention and are incorporated herein by reference.

In addition to the information for extending the picture width, the augmentation signals include information for providing improved resolution by transmitting a line differential signal, and a high frequency luminance component. As previously configured, these transmissions required a channel bandwidth of 6 MHz. It is the purpose of this invention to provide a sYstem that transmits the augmentation information within a 3 MHz channel.

SUMMARY OF THE INVENTION

In accordance with the principles of the present invention HDTV signals, compatible with NTSC receivers, are provided with an efficient use of bandwidth so that the augmentation information, digital stereo audio, and digital synchronization may be transmitted within a 3 MHz bandwidth.

In accordance with the invention, second and fourth line differential signals of a four line cycle are divided into three segments, a left panel segment, a center segment and a right panel segment. The left and right panel segments of the line differential signals are time expanded, appropriately delayed, for the corresponding segments on the second and fourth line differential signals to be in time coincidence, and quadrature modulated on a first subcarrier signal. The line differential central segment is time expanded to a time equal to the expanded active line time of NTSC systems and quadrature modulated with the NTSC signal. Left and right panel signals of the four line cycle are appropriately delayed for corresponding segments to be in time coincidence and quadrature modulated on a second subcarrier. High frequency luminance information is decimated vertically by selecting one line of the four line cycle for luminance transmission. This luminance signal is time expanded and heterodyned with a subcarrier signal at a frequency which positions a sideband of the heterodyning process in a frequency band contiguous with the frequency bands occupied by the quadrature modulated first subcarrier carrying the line differential panel signals. Digital stereo audio of compact disc quality is heterodyned with a signal at a frequency which permits the sidebands of the heterodyning process to be frequency multiplexed with the quadrature modulated and Yh components within the desired 3 MHz band. The composite 3 MHz band is translated to the RF channel to amplitude modulate the picture carrier signal, wherein the carrier may be suppressed.

Since quadrature modulation is used only for signals which are highly correlated, quadrature errors only establish static errors at DC and slightly distort signals with sharp vertical transitions. Accurate quadrature demodulation and precise phase recovery at the receiver may be accomplished with the extraction of pilot bursts of the sub carriers transmitted during retrace intervals.

BRIEF DESCRIPTION OF THE DRAWINGS

FIG. 3 illustrates the information arrangement on an augmentation superline and the information continued in the main channel.

FIG. 4 is a frequency band arrangement for a 3 MHz augmentation channel contiguous with a 6 MHz main channel.

DESCRIPTION OF THE PREFERRED EMBODIMENTS

Figure 1:
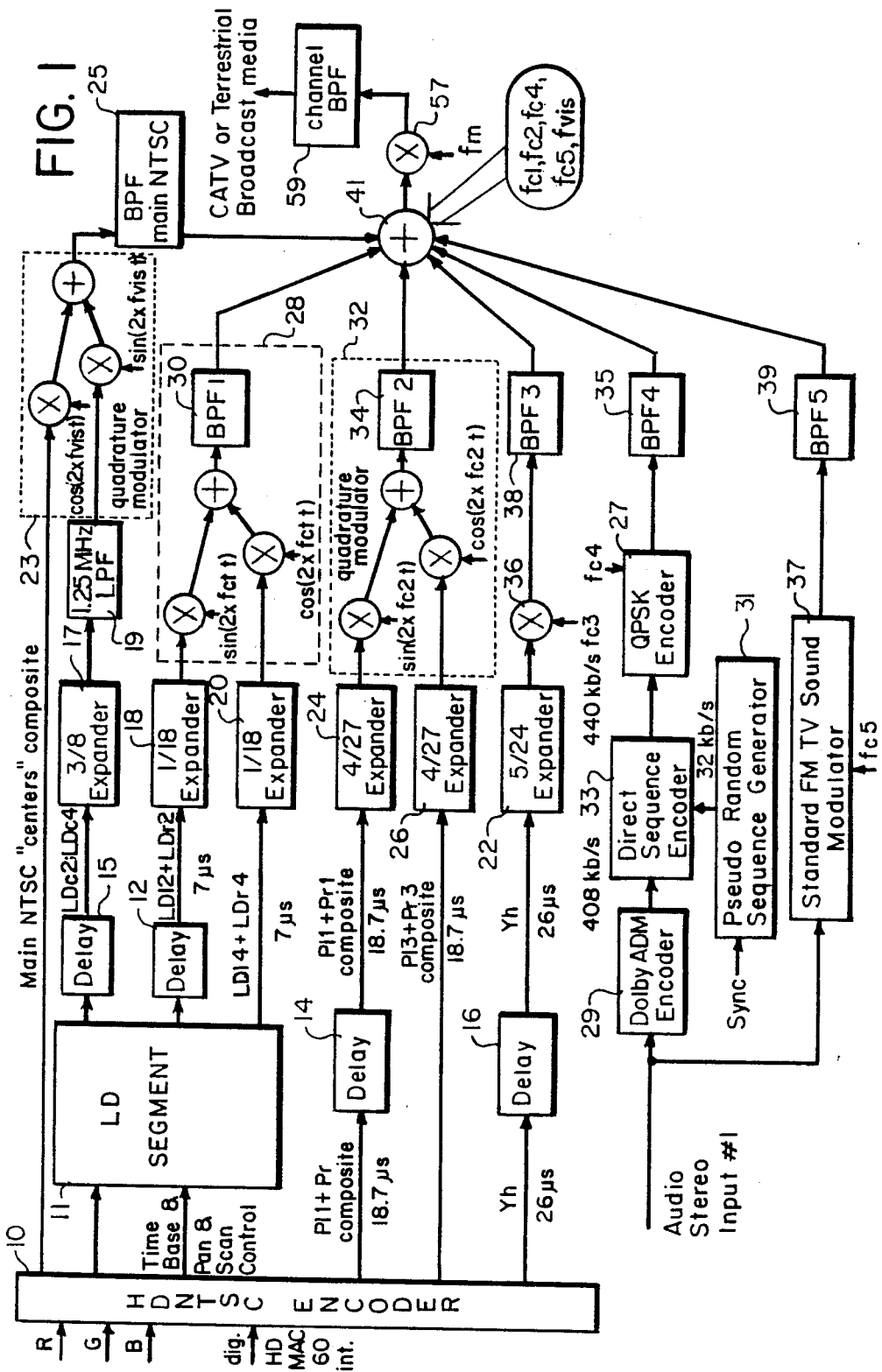
FIG. 1 is a block diagram a HDNTSC encoder with a 3 MHz augmentation channel.

Referring to FIG. 1, a HDNTSC encoder 10, as described in the incorporated patent applications separates the signals defining an image into three segments, left panel, center segment, and right panel. The center segment signals define the NTSC image having a 4:3 aspect ratio, while the left and right panel signals provide the information for the remainder of an image having a 16:9 aspect ratio. Pan and scan techniques permit the center panel to be positioned anywhere within the confines of the overall 16:9 aspect ratio image, causing the left and right panels to vary, though the percentage of the overall image in these two panels remains constant. Though the source indicated in the figure is RGB, it should be recognized that a HDMAC-60 source may also be utilized. The HDNTSC encoder provides a superline which contains two line differential signals (LD2 and LD4), the segment of the first line in the left panel (PL1), the segment of the first line in the right panel (PR1), the segment of the third line in the left panel (PL3) the segment of the third line in the right panel (PR3), and a luminance signal Yh, all extracted from a sequence of four source lines.

LD signals are formed from complete horizontal scan lines and are generated for every other source line. These lines correspond to the second (LD2) and fourth (LD4) in the four source line cycle. LD2 is established by subtracting one half the sum of the first and third lines from the second line, while LD4 is established by subtracting one-half the sum of the third line and the first line in the next cycle from the fourth line. These LD signals have adjacent time slots on the super line and are provided at the LD output terminal of the encoder 10. Panel signals are extracted from the original line in the time sequence PL1(first)/PR1/PL3/PR3-(last). The luminance signal Yh is provided by vertically decimating the high frequency luminance information in a manner Which selects one source line in each cycle. In this way the diagonal resolution is limited, but tailored well to the human visual system.

LD signals from the encoder 10 are coupled to a center and panel extraction circuit 11, wherein the LD signals for the second and fourth source lines are separated into left panel, center segment, and right panel line differential signals, respectively designated, for LD2 and LD4, as LDL2 and LDL4, LDC2 and LDC4, and LDR2 and LDR4. Pan and scan control signals coupled to the extraction circuit 11 from the HDNTSC encoder 10 are utilized to establish the position of the constant time interval central segment line differential signals, LDC2 and LDC4, within a horizontal line scan time, and to establish the time intervals for the line differential signals in the left and right panels. This extraction is accomplished in the manner employed by the HDNTSC encoder 10 to separate the NTSC signals and generate the left and right panel augmentation signals. The left and right panel signals (PL and PR) emerge from the encoder 10 with PR contiguous with PL(PL+PR). Similarly, the left and right panel differential signals (LDL and LDR) emerge from extractor 11 with LDR contiguous with LDL(LDC+LDR). LDL2+LDR2 is delayed in delay circuit 12 to be in time coincidence with LDL4+LDR4, PL1+PR1 is delayed in delay circuit 14 to be in time coincidence with PL3+PR3, while Yh is delayed in delay circuit 16 to be in time alignment with the LD and PL signals.

Figure 2:
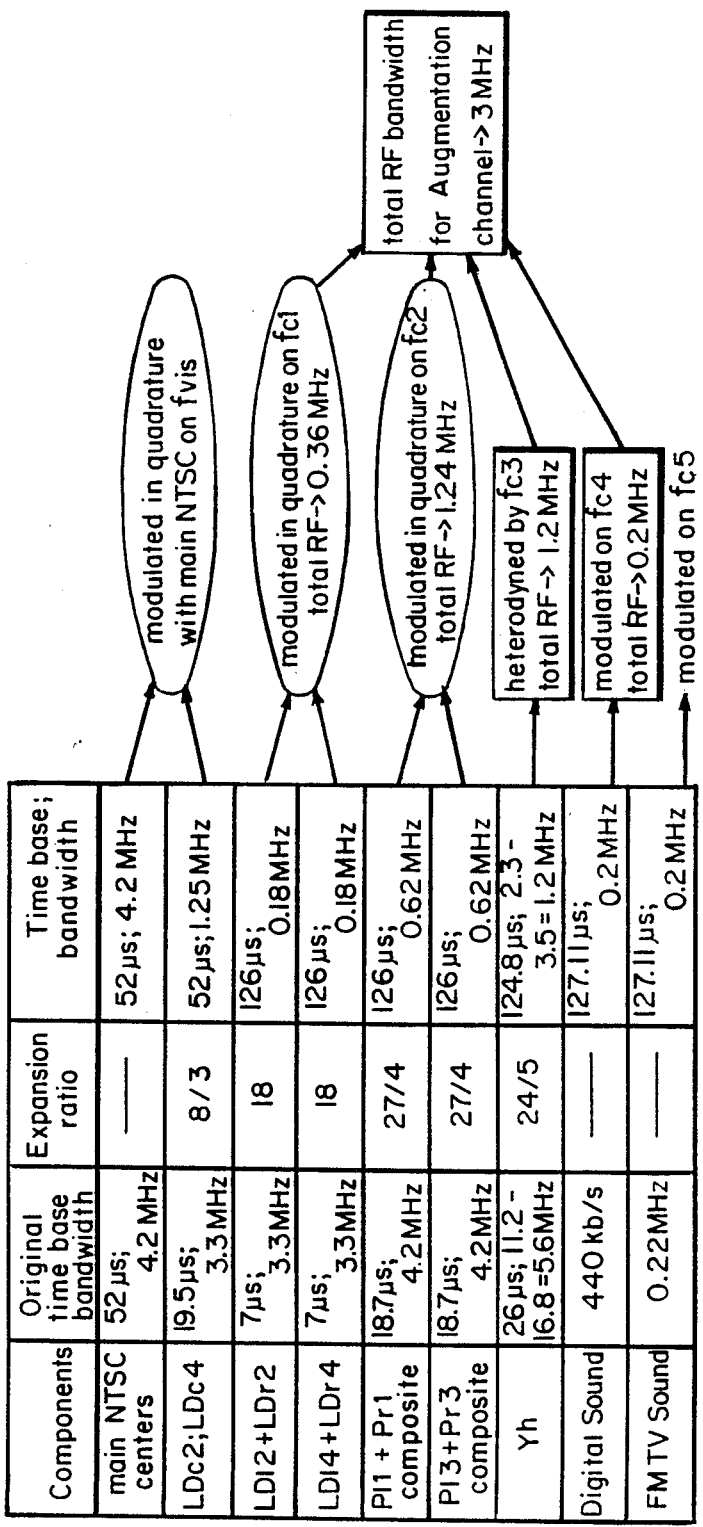
FIG. 2 is a component tabulation of time and frequency allocations for a 3 MHz augmentation channel.

Yh signals and the time alignment line differential and panel signals are time expanded to reduce signal bandwidth prior to further processing. The LD panel signals are expanded by a factor of 1:18 in expansion circuits 18 and 20, the Yh signals are expanded bY a factor of 5:24 in expansion circuit 22, while the PL signals are time expanded by a factor of 4:27 in expansion circuit 24 and 26. The original time base and base bandwidth of the signals provided bY the HDNTSC encoder 10 and the time base and base bandwidth established by these time expansions are shown in FIG. 2. These expansion factors achieve a signal-to-noise ratio improvement for the received picture over that provided by the prior art and reduce the impact of channel echoes, thereby realizing better ghost rejection.

Nominally, the LD line time is 26 usec; extraction of the 4:3 center out of the 16:9 total picture yields a factor of 75% [(4/3)/(16/9)] for the center segment, leaving 25% of the 26 usec or 6.5 usec for the left and right LD. An allowance of 0.6 usec for overlap redundancy during wide aspect ratio decomposition and recombination is added to the center segment time, thereby establishing a total time for the left and right LD of 7.1 usec.

Referring to FIG. 2, LD2 and LD4 are depicted as 26 usec of active picture content. Under pan and scan control, in tandem with pan and scan for the NTSC picture, LD2 is segmented into: LDL2, LDR2, and LDC2, and LD4 into: LDL4, LDR4, and LDC4. As stated above, the LD panels for each line are allotted 7.1 usec, with the center section being allotted 19.5 usec (75% of the nominal line time of 26 USEC). After selection the LD center is delayed in delay circuit 15 to be in time alignment with the NTSC signals and coupled to a time expander 17 to be expanded by the same 3:8 factor applied to the NTSC signals, whereafter it is coupled through bandpass filter 19 for band limiting to 1.25 MHz. The delay establishes LDC2 in time alignment with the first NTSC source line in the cycle and LDC4 in time alignment with the third NTSC source line. Since the LD represents a vertical-temporal deinterlacing signal, it is highly correlated with the NTSC signal. Expansion of the LD center by the same factor applied to the NTSC signals maintains this correlation.

After the separation of LDC2 and LDC4 from LD and the time alignment of these signals with the NTSC signals, the main signal package line time budget B1 and the augmentation signal line time budget B2 are shown in FIG. 3. The main signal package B1 has included therein housekeeping signals which utilize 10.5 usec and has a total time duration of 63.55 usec. Included with the augmentation signal line time budget is 1.1 usec for bursts of subcarrier signals, yet to be discussed, thus extending the augmentation signal line time from 126 usec to 127.1 usec.

As shown in FIG. 2, the LD signals are band limited horizontally to 3.3 MHz. After expansion the LD center line time is consistent with the nominal NTSC active line time of 52 usec [(0.75)×(26 usec)×(8/3)=52]. Time expansion by a 3:8 factor reduces the bandwidth of the LD center signal to nominally 1.2 MHz.

The delayed and time expanded LDC signals and the NTSC signals are coupled to a quadrature modulator 23, wherein they are quadrature modulated and filtered in channel filter 25.

The digital sound (DS) information may result, for example, from QPSK modulation in a QPSK encoder 27 of Dolby Adaptive Modulated (ADM) signals from encoder 29. The data rate for ADM is 408 kilobits, an additional 32 kilobits per second may be added for synchronization from a pseudo-random sequence generator 31 via a direct sequence encoder 33, providing a total bit rate for the DS packet of 440 kilobits per second. Using QPSK, the channel could accommodate two bits per hertz, which means that the DS packet would require a nominal 0.2 MHz of total bandwidth continuously.

Thus, to achieve a desired 3 MHz overall bandwidth, 2.8 MHz is allocated to the augmentation video signals. The pulse train output from QPSK encoder 27 is coupled through a bandpass filter 35.

Standard FM television sound is coupled to a frequency modulator 37 wherein it frequency modulates a subcarrier $f_{c5}$. The resulting FM signal is then coupled via bandpass filter 39 for transmission.

After the delays and time expansions, the corresponding LD2 panel segment signals emerge in time coincidence with the time expanded LD4 panel segment signals. Similarly the panel segment signals of the first line in the cycle are delayed and expanded to emerge in time coincidence with the corresponding expanded panel segment signals of the third line. As illustrated in FIG. 1, the LD time coincident signals are coupled to quadrature modulator 28, wherein corresponding segment signals, LDL2-LDL4 and LDR2-LDR4, are modulated in quadrature onto a subcarrier signal at a frequency $f_{c1}$ and coupled through a bandpass filter 30. Similarly, the panel segment time coincident signals, PL1-PL3 and PR1-PR3, are coupled to quadrature modulator 32, wherein these signals are modulated in quadrature onto a subcarrier signal at a frequency $f_{c2}$ and coupled through a bandpass filter 34. The subcarrier frequencies $f_{c1}$ and $f_{c2}$ are chosen to establish contiguous frequency bands for the line differential (LD) panel signals and the panel (FL) signals. It should be recognized that a Yh sideband contiguous with the LD and PL continuum may be provided with $f_{c3}$ equal to either $f_{c1}$ and $f_{c2}$, thus eliminating the necessity of transmitting bursts of the Yh subcarrier.

Expanded and time delayed Yh signals are coupled to a heterodyning circuit 36 wherein the Yh signals are heterodyned with a third subcarrier at a frequency $f_{c3}$. The frequency $f_{c3}$ is chosen to provide a sideband, as for example, the upper sideband in a frequency band abutting the contiguous quadrature modulated LD and panel signals. It should be recognized that Yh sideband contiguous with LD and PL continuum may be provided with $f_{c3}$ equal to either $f_{c1}$ or $f_{c2}$, thus eliminating the necessity of transmitting bursts of the Yh subcarrier.

Signals from bandpass filters 25, 30, 34, 35, 38, and 39 are coupled to a combining network 41. Also coupled to combining network 41 are bursts of the subcarrier frequencies $f_{c1}$, $f_{c2}$, $f_{c5}$, and $f_{vis}$, which are provided during retrace intervals. Combining network 41 provides a frequency band arrangement as shown in FIG. 4. The main channel utilizes a 6 MHz band within which is the 1.25 MHz band of the line differential center segment 45 quadrature modulated with the NTSC signals 43 about the subcarrier fvis and the standard FM sound 47 in a 0.2 MHz band about the subcarrier $f_{c5}$. Contiguous with the main channel is the 3 MHz augmentation channel. This channel includes the digital 49 sound covering a 0.2 MHz band about the subcarrier $f_{c4}$ followed by the quadrature modulated panel signals 51 covering a frequency band of 1.24 MHz about the subcarrier $f_{c2}$, the quadrature modulated panel line differential signals 53 about the subcarrier $f_{c1}$, and the luminance signals sideband 55 generated by the heterodYning process with either $f_{c1}$ or $f_{c2}$.

Selection of upper sideband of the Yh modulation takes advantage of the natural rolloff of the Yh video signal, positioning this relatively slow rolloff at the end of the frequency multiplex band. Through the upper sideband has been chosen in the example presented, the selection of the lower sideband is also possible.

The frequency multiplexed signal from combining network 41 is provided a subcarrier fm in modulation circuit 57 and passed via channel bandpass filter 59 to the transmitter.

Figure 5:
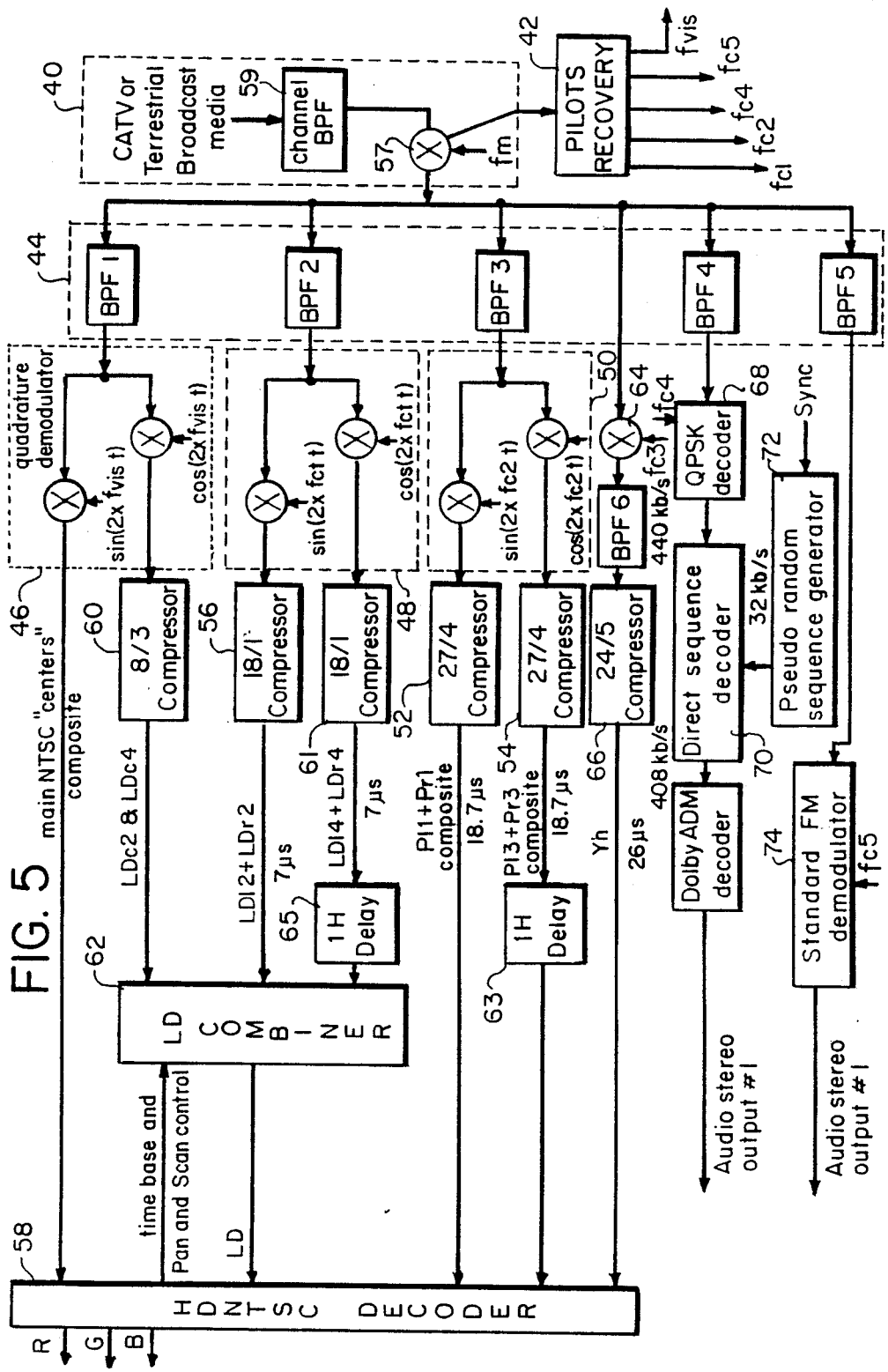
FIG. 5 is a block diagram of a HDNTSC decoder with a 3 MHz augmentation channel.

Refer now to FIG. 5, which is a block diagram of a preferred main and augmentation channel decoder. The received RF signal, modulated with the 6 MHz main channel and the 3 MHz augmentation channel, is converted to the frequency multiplexed signal provided at the output of combining network 57 by a channel translator 40, which also provides the pilot bursts to a pilots recovery circuit 42, wherein the subcarrier at frequencies $f_{c1}$, $f_{c2}$, $f_{c4}$, $f_{c5}$, and $f_{vis}$ are generated to be utilized for the recovery of the video and audio signals. The frequency multiplexed signal is coupled to frequency demultiplexer 44 which extracts the main channel, digital audio, panel, line differential panel, and luminance signals. Frequency demultiplexed main channel signals are coupled to quadrature demodulator 46, as is the subcarrier at the frequency $f_{vis}$, wherein the NTSC and time expanded LDC signals are separated. Similarly, the LD and PL signals and the subcarriers at frequencies $f_{c1}$ and $f_{c2}$, are respectively coupled to quadrature demodulators 48 and 50 wherein the time expanded LDL2+LDR2 is separated from the time expanded LDL4+LDR4 and time expanded PL1+PR1 is separated from time expanded PL3+PR3.

The panels signals were quadrature modulated prior to transmission. PL1 and PL3 were modulated in quadrature followed in time by the quadrature modulation of PR1 and PR3. Consequently, as shown in FIG. 5, one output terminal of demodulator 50 provides PL1+PR1, while a second output terminal provides PL3+PR3. PL1 and PL3 appear in time coincidence at the output terminals as do PR1 and PR3.

The demodulated PL1+PR1 and PL3+PR3 panel signals are respectively coupled to time compressors 52 and 54 wherein a 27:4 compression is applied to remove the expansion factor applied by the encoder. Compressed PL3+PR3 panel signals are coupled to delay circuits 56 wherein these panel signals are repositioned so that the proper order of PL1(first)/PR1/PL3/PR3(last) is provided to HDNTSC decoder 61.

The LD signals were also quadrature modulated prior to transmission. LDL2 and LDL4 signals were modulated in quadrature as were LDR2 and LDR4 signals. One output terminal of the quadrature demodulator 48 provides LDL2+LDR2, while a second output terminal provides LDL4+LDR4. LDL2 and LDL4 emerge in time coincidence at the output terminals as do LDR2 and LDR4.

The demodulated LD panel segment signals are coupled to time compressors 56 and 58 wherein 18:1 compression is applied to remove the expansion factor applied by the encoder. Compressed LDL4+LDR4 panel signals are coupled to delay circuit 65 wherein these panel signals are repositioned so that the proper order of LDL2(first)/LDR2/LDL4/LDR4(last) is provided to LD combiner 62, yet to be discussed.

The time expanded LDC2+LDC4 signal from the quadrature modulator 46 is compressed by a 8:3 factor in time compressor 60 and the compressed signal provided therefrom is coupled to LD combiner 62, which is also provided the time base and pan and scan control from HDNTSC decoder 58. LD combiner 62 separates the LDL+LDR signals and properly positions the LDC segments between the two panel signals to provide complete LD signals to HDNTSC decoder 58.

Frequency demultiplexed luminance signals and the subcarrier signal at the frequency $f_{c3}$, which may be $f_{c2}$ or $f_{c1}$ as previously stated, are coupled to heterodyning circuit 64, wherein these signals are heterodyned to recover the time expanded Yh signals. The time expanded Yh signals are bandpass filtered and compressed in a 24:5 time compressor 66 wherefrom the desired Yh signal is provided to the HDNTSC decoder 58 for addition with the low frequency luminance signal.

The digital sound frequency channel provided by frequency demultiplexer 44 and the subcarrier signal at the frequency $f_{c4}$ are coupled to QPSK decoder 68, wherefrom the digital coded sound at 440 Kb/s is coupled to a direct sequence decoder 70, to which a 32 Kb/s pseudo random sYnchronization signal from a generator 72 is also coupled. Direct sequence decoder 70 utilizes the 32 Kb/s pseudo random sequence to extract a 408 Kb/s digitally coded audio signal from the 440 Kb/s coded signal. This 408 Kb/s digital signal is coupled to an ADM decoder wherefrom stereo sound signals are provided to the audio circuits of the receiver.

Standard FM audio signals are provided bY coupling the FM audio channel provided by the frequency demultiplexer 44 and the FM carrier $f_{c5}$ from the pilots recovery 42 to a FM demodulator 74 which FM demodulates the FM signal to provide the audio signal for the main channel audio circuits.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. A frequency multiplexed television apparatus comprising:
   means for receiving television signals including line differential signals, panel signals, luminance signals, digital audio signals, FM audio signals, and conventional television image signals;
   means coupled to said receiving means for segmenting said line differential signals into a center segment corresponding to said conventional television image signals and panel signals, thereby providing line differential center signals and line differential panel signals;
   means coupled to said receiving means and said segmenting means for time expanding said panel signals, said luminance signals, and said line differential center and panel signals so as to form time expanded signals, time expanded luminance signals and time expanded line differential center and panel signals respectively;
   means for combining said time expanded line differential center segment and said conventional television image signals so as to form a combined signal;
   means coupled to said time expanding means and said combining means for frequency multiplexing said time expanded panel signals, said time expanded luminance signals, said time expanded line differential panel signals, said digital audio signals, said FM audio signals, and said combined signal, thereby providing a frequency multiplexed signal.

2. The apparatus of claim 1 further comprising: modulation means coupled to receive said time expanded line differential panel signals and said time expanded panel signals for providing quadrature modulated line differential panel signals and quadrature modulated panel signals.

3. The apparatus of claim 2 wherein said modulation means further comprises:
   delay means coupled to said time expanding means for positioning said time expanded line differential panel signals, and time expanded panel segments in time coincidence; and
   quadrature modulator means coupled to said delay means for quadrature modulating said time expanded line differential panel signals and for quadrature modulating said time expanded panel signals, thereby providing a plurality of quadrature modulated signals.

4. The apparatus of claim 3 wherein said time expanding means comprises:
   means coupled to said segmenting means for time aligning said line differential center signals with said conventional television image signals; and
   a time expander coupled between said time aligning means and said combining means, thereby providing line differential center signals correlated with said conventional television image signals.

5. The apparatus of claim 4 wherein said combining means includes means for quadrature modulating said time expanded line differential center signals with said conventional television image signals.

6. The apparatus of claim 3 wherein said time expanding means time expands said line differential panel signals in accordance with a 1:18 ratio, said panels signals in accordance with a 4:27 ratio and said luminance signals in accordance with a 5:24 ratio and said line differential center signals in accordance with a 3:8 ratio.

7. A television apparatus comprising:
   means for receiving a frequency multiplexed television signal comprising line differential center signals quadrature modulated with conventional television image signals, a digital audio signal, an FM audio signal, quadrature modulated time expanded line differential panel signals, quadrature modulated time expanded panel signals, time expanded luminance signals, and subcarrier burst signals at frequencies $f_{c1}$, $f_{c2}$, and $f_{c4}$, $f_{c5}$ and $f_{vis}$;
   means coupled to said receiving means for generating subcarrier signals at frequencies $f_{c1}$, $f_{c2}$, $f_{c4}$, $f_{c5}$, $f_{vis}$ from said subcarrier burst signals;
   means coupled to said receiving means for demultiplexing said frequency multiplexed signal and for separating therefrom said conventional television image signals, said FM audio signal, said digital audio signal, said time expanded panel signals, said time expanded line differential center and panel signals, and said time expanded luminance signals;
   means coupled to receive said time expanded line differential panel signals, said time expanded panel signals, and said time expanded luminance signals for compressing said time expanded signals to obtain at least one line differential panel signal and a line differential center signal, at least one panel signal, and luminance signals;
   means for combining said luminance signals, said line differential center and panel signals said panel signals and said conventional television image signals so as to provide a wide aspect ratio display.

8. A method for providing television signals comprising the steps of:

receiving conventional television signals, line differential signals, left and right panel signals, luminance signals, and digital audio signals;

separating said line differential signals into left panel line differential signals, center segment line differential signals, and right panel line differential signals;

time expanding said left and right panel line differential signals, said left and right panel signals, and said luminance signals to obtain time expanded left and right panel line differential signals, time expanded left and right panel signals, and time expanded luminance signals;

quadrature modulating said time expanded left and right panel line differential signals and said time expanded left and right panel signals, to obtain quadrature modulated time expanded left and right panel line differential signals and quadrature modulated time expanded left and right panel signals within contiguous frequency bands;

converting said time expanded luminance signals to a frequency band abutting said contiguous bands;

converting said digital stereo audio signal to occupy a frequency band abutting said contiguous frequency band;

combining said contiguous frequency bands and said abutting frequency bands to obtain an augmentation frequency band;

time expanding said center segment line differential signal to be of a time duration consistent with horizontal line durations of said television signals, therebY providing time expanded center segment line differential signals; and quadrature modulating said time expanded line differential signals with said conventional television signals to occupy a television frequency band contiguous with said augmentation frequency band.

9. The method of claim 8 wherein the step of quadrature modulating includes the steps of:

delaying first time expanded left and right panel line differential signals to be time coincident with second time expanded left and right panel line differential signals respectively;

delaying time expanded first left and right panel signals to be time coincident with time expanded second left and right panel signals, respectively;

coupling time coincident time expanded left and right panel line differential signals and time coincident left and right panel signals to a quadrature modulator to obtain said quadrature modulated time expanded line differential signals and said quadrature time expanded left and right panel signals.

10. Apparatus for generating a frequency multiplexed television signal, comprising:

means for receiving conventional image signals, and at least a first and second set of augmentation signals;

means connected to said receiving means for time expanding said first and second set of augmentation signals, thereby creating a first and second set of time expanded augmentation signals; and means coupled to said time expanding means and said receiving means for frequency multiplexing said conventional image signals, said first set of time expanded augmentation signals, and second set of time expanded augmentation signals, thereby generating said frequency multiplexed television signal.

11. The apparatus of claim 10, further comprising means for transmitting or recording said frequency multiplexed television signal, thereby creating a frequency multiplexed transmitted signal or a frequency multiplexed recorded signal, respectively.

12. The apparatus of claim 11, further comprising television receiving apparatus for receiving said frequency multiplexed transmitted signal, thereby creating a received frequency multiplexed television signal;

means for demultiplexing said received frequency multiplexed transmitted signal, thereby creating said conventional image signals and said first and second set of time expanded augmentation signals; and means for processing said conventional image signals and said first and second set of augmentation signals to create a unified display.

13. The apparatus of claim 10, wherein said first and second set of augmentation signals comprise, respectively, line differential signals for increasing vertical definition and panel signals for increasing the aspect ratio of said conventional image signals.

14. The method of claim 13, further comprising the steps of:

receiving said frequency multiplexed transmitted signal, thereby creating a received frequency multiplexed transmitted signal;

demultiplexing said received frequency multiplexed transmitted signal, thereby creating said conventional image signal and said first and second set of expanded augmentation signals; and processing said conventional image signals and said first and second set of augmentation signals to create a unified display.

15. Apparatus for generating a frequency multiplexed television signal, comprising:

means for receiving television signals comprising conventional image signals and augmentation signals comprising line differential signals and panel signals, means coupled to said receiving means for segmenting said line differential signals into a center segment corresponding to said conventional image signals and at least one panel segment, thereby providing line differential center segment signals and line differential panel signals;

means coupled to said receiving means and said segmenting means for time expanding said augmentation panel signals, and said line differential panel signals;

means coupled to said segmenting means for time expanding said line differential center segment signals to be of a time duration consistent with a horizontal line time of said conventional image signals thereby providing time expanded line differential center segment signals;

means for combining said time expanded line differential center segment signals and said conventional image signals, thereby creating combined signals; and means coupled to said time expanding means and said combining means for frequency multiplexing said time expanded augmentation panel signals with said time expanded line differential panel signals and said combined signals, thereby creating said frequency multiplexed television signal.

16. Method for generating frequency multiplexed television signal, comprising the steps of:

receiving conventional image signals, and at least a first and second set of augmentation signals;

time expanding said first and second set of augmentation signals, thereby creating a first and second set of time expanded augmentation signals; and frequency multiplexing said conventional image signals, said first set of time expanded augmentation signals and second set of time expanded augmentation signals, thereby generating said frequency multiplexed television signal.

17. A method for encoding a wide aspect ratio television picture, said method comprising the steps of:
(a) separating said wide aspect ratio television picture into a center portion and at least one panel portion;
(b) generating from said center portion a conventional television signal;
(c) generating from said at least one panel portion, a plurality of panel signals;
(d) generating from said wide aspect ratio picture a plurality of line differential signals;
(e) separating said line differential signals into line differential center components and line differential panel components;
(f) generating from said wide aspect ratio television picture, a high frequency luminance signal;
(g) combining said center line differential components with said conventional television signal so as to form a first modulated signal;
(h) combining said line differential panel components so as to form a second modulated signal;
(i) combining said panel signals so as to form a third modulated signal;
(j) modulating said high frequency luminance signal on a subcarrier so as to form a fourth modulated signal having at least one sideband signal; and
(k) multiplexing said first, second and third modulated signals and said sideband signal so as to form a multiplexed television signal.

18. An apparatus for encoding a wide aspect ratio television picture, said apparatus comprising:
(a) means for separating said wide aspect ratio television picture into a center portion and at least one panel portion;
(b) means coupled to said first separating means for generating from said center portion, a conventional television signal;
(c) means coupled to said first generating means for generating from said at least one panel portion, a plurality of panel signals;
(d) third generating means coupled to said second generating means for generating from said wide aspect ratio picture, a plurality of line differential signals;
(e) second separating means coupled to said third generating means for separating said line differential signals into line differential center components and line differential panel components;
(f) fourth generating means coupled to said second separating means for generating from said wide aspect ratio television picture, a high frequency luminance signal;
(g) first combining means for modulating said line differential center components with said conventional television signal so as to form a first modulated signal;
(h) second combining means for modulating a plurality of line differential panel components so as to form a second modulated signal;
(i) third combining means for modulating said panel signals so as to form a third modulated signal;
(j) fourth combining means coupled to said third combining means for modulating said high frequency luminance signal on a subcarrier in order to form a fourth modulated signal having at least one sideband signal; and
(k) multiplexing means coupled to said fourth combining means for multiplexing said first, second and third modulated signals and said sideband signal so as to form a multiplexed television signal.

19. The apparatus of claim 18, wherein at least one of said first, second and third combining means is a quadrature modulator.

20. The apparatus of claim 19, wherein said multiplexing means is a frequency multiplexer.

21. Means for decoding the multiplexed television signal described in claim 18 and for providing therefrom a wide aspect ratio television display, said apparatus comprising:
means for demultiplexing first, second and third modulated signals and said sideband signal;
means for deriving from said first, second and third modulated signals said conventional television signal, said line differential signals, and said panel signals; and
means for combining said conventional television signal, said line differential signals and said panel signals into a wide aspect ratio television display.

22. Means for decoding the multiplexed television signal described in claim 20 and for providing therefrom a wide aspect ratio television display, said apparatus comprising:
means for demultiplexing first, second and third modulated signals and said sideband signal;
means for deriving from said first, second and third modulated signals said conventional television signal, said line differential signals, and said panel signals; and
means for combining said conventional television signal, said line differential signals and said panel signals into a wide aspect ratio television display.

* * * * *

UNITED STATES PATENT AND TRADEMARK OFFICE
CERTIFICATE OF CORRECTION

PATENT NO. : 4,977,454
DATED : December 11, 1990
INVENTOR(S) : TSINBERG

It is certified that error appears in the above-identified patent and that said Letters Patent is hereby corrected as shown below:

ON TITLE PAGE: Item [73]

should read;

North American Philips Corporation

100 East 42nd Street

New York, NY 10017

A corporation of the State of Delaware

Signed and Sealed this

Twenty-eighth Day of April, 1992

Attest:

HARRY F. MANBECK, JR.

*Attesting Officer*  *Commissioner of Patents and Trademarks*